(12) United States Patent
Un et al.

(10) Patent No.: US 9,279,878 B2
(45) Date of Patent: Mar. 8, 2016

(54) LOCATING A MOBILE DEVICE

(75) Inventors: Edward Ding-Bong Un, Beijing (CN); Jun Zhao, Beijing (CN); Kai Wang, Beijing (CN); Hailong Mu, Beijing (CN); Zeyong Xu, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 808 days.

(21) Appl. No.: 13/431,497

(22) Filed: Mar. 27, 2012

(65) Prior Publication Data

US 2013/0260782 A1 Oct. 3, 2013

(51) Int. Cl.
*H04W 24/00* (2009.01)
*G01S 5/02* (2010.01)
*H04W 64/00* (2009.01)

(52) U.S. Cl.
CPC ............. *G01S 5/0252* (2013.01); *G01S 5/0278* (2013.01); *H04W 64/00* (2013.01)

(58) Field of Classification Search
CPC ..... H04W 4/028; H04W 4/023; H04W 4/008; G06Q 30/0225
USPC ........................................ 455/456.1; 370/338
See application file for complete search history.

(56) References Cited

U.S. PATENT DOCUMENTS

| 6,029,070 | A | 2/2000 | Kingdon et al. |
| 6,990,428 | B1 | 1/2006 | Kaiser et al. |
| 7,317,419 | B2 | 1/2008 | Sugar et al. |
| 7,319,877 | B2 | 1/2008 | Krumm et al. |
| 8,077,090 | B1 | 12/2011 | Chintalapudi |
| 8,200,251 | B2 * | 6/2012 | Huang ............. 455/457 |
| 2004/0085909 | A1 * | 5/2004 | Soliman ........... 370/252 |
| 2005/0246334 | A1 | 11/2005 | Tao et al. |
| 2006/0075131 | A1 | 4/2006 | Douglas et al. |
| 2006/0199546 | A1 | 9/2006 | Durgin |
| 2007/0281714 | A1 * | 12/2007 | Douglas et al. ............. 455/456.1 |
| 2008/0188242 | A1 | 8/2008 | Carlson et al. |

(Continued)

FOREIGN PATENT DOCUMENTS

| EP | 2360605 A1 | 8/2011 |
| KR | 1020090059920 A | 6/2009 |
| WO | 2011071199 A1 | 6/2011 |

OTHER PUBLICATIONS

Int. Search Report cited in PCT Application No. PCT/US2013/029735 dated May 31, 2013, 10 pgs.

(Continued)

*Primary Examiner* — Marcos Batista
(74) *Attorney, Agent, or Firm* — Dave Ream; Tom Wong; Micky Minhas

(57) ABSTRACT

Identifying a location of a mobile device is disclosed (e.g., presuming user consent to the same). One or more received signal strengths (RSSs), comprising a first RSS, may be received by a first access point (AP) from the mobile device. The RSSs may be used to identify a grid area, comprising a first grid space. A signal distance between the first grid space and the first AP may be identified using the first RSS, and combined with a first grid space distance, comprising a known distance between the first grid space and the first AP, to determine a first grid space likelihood score for the first grid space. A second grid space likelihood score may be determined for a second grid space (e.g., and a third, etc.), and the grid space comprising a desired grid space likelihood score (e.g., highest) may be selected as the mobile device location.

20 Claims, 10 Drawing Sheets

(56) References Cited

U.S. PATENT DOCUMENTS

| | | |
|---|---|---|
| 2008/0200181 A1 | 8/2008 | Zill |
| 2011/0179027 A1 | 7/2011 | Das |
| 2011/0304503 A1 | 12/2011 | Chintalapudi et al. |
| 2011/0320539 A1 | 12/2011 | Zhao et al. |
| 2012/0310746 A1 | 12/2012 | Zhao et al. |
| 2013/0079027 A1* | 3/2013 | Hand et al. ............... 455/456.1 |

OTHER PUBLICATIONS

Bose, et al., "A Practical Path Loss Model for Indoor WiFi Positioning Enhancement", Retrieved at <<http://ieeexplore.ieee.org/ielx5/4446227/4449533/04449717.pdf?tp=&arnumber=4449717&isnumber=4449533>>, 6th International Conference on Information, Communications & Signal Processing, Dec. 10, 2007, pp. 1-5.

Bshara, et al. "Localization in WiMAX Networks Based on Signal Strength Observations", Retrieved at <<http://www.ieee-globecom.org/2008/downloads/DD/DD16W2%20Localization/DD16W2%20Bshara%20M/WiMAX_RSS-Loc_IEEE.pdf>>, 2008, pp. 5.

"Location Tracking Approaches", Retrieved at <<http://www.cisco.com/en/US/docs/solutions/Enterprise/Mobility/wifich2.html>>, Retrieved Date: Dec. 23, 2012, pp. 8.

Seidel, et al., "914 MHz Path Loss Prediction Models for Indoor Wireless Communications in Multifloored Buildings", Published Date: Feb. 1992, Proceedings: IEEE Transactions on Antennas and Propagation, pp. 207-217 http://ieeexplore.ieee.org/stamp/stamp.jsp?tp=&arnumber=127405.

Krumm, et al., "LOCADIO: Inferring Motion and Location from Wi-Fi Signal Strengths", Published Date: Aug. 22, 2004, Proceedings: First Annual International Conference on Mobile and Ubiquitous Systems: Networking and Services (Mobiquitous, 2004), http://research.microsoft.com/en-us/um/people/horvitz/locadio.pdf.

Tsuchiya, et al., "Localization Algorithms for Distributed Platform among Vehicles" —Published Date: Oct. 12, 2009, Proceedings: International Conference on Ultra Modern Telecommunications & Workshops, 2009 (ICUMT '09), pp. 1-6, http://ieeexplore.ieee.org/stamp/stamp.jsp?tp=&arnumber=5345615.

Chintalapudi, et al., "Indoor Localization without the Pain"—Published Date: Sep. 20, 2010 Proceedings: Proceedings of the Sixteenth Annual International Conference on Mobile Computing and Networking (MobiCom'10), http://research.microsoft.com/pubs/135721/ez-mobicom.pdf.

Ji, et al., "Ariadne: A Dynamic Indoor Signal Map Construction and Localization System"—Published Date: Jun. 19, 2006, Proceedings: Proceedings of the 4th international conference on Mobile systems, applications and services (MobiSys '06), pp. 151-164, http://www.usenix.org/events/mobisys06/full_papers/p151-ji.pdf.

Wang, et al., "Residual Ranking: A Robust Access-Point Selection Strategy for Indoor Location Tracking"—Published Date: Oct. 11, 2009, Proceedings: IEEE International Conference on Systems, Man and Cybernetics, 2009. (SMC 2009), pp. 5035-5040, http://ieeexplore.ieee.org/stamp/stamp.jsp?tp=&arnumber=5346041.

Gorrich, et al., "Alternatives for Indoor Location Estimation on Uncoordinated Environments"—Published Date: Sep. 2, 2011, Proceedings: IEEE 13th International Conference on High Performance Computing and Communications (HPCC), 2011, pp. 971-976, http://ieeexplore.ieee.org/stamp/stamp.jsp?arnumber=06063108.

Non-Final office Action cited in U.S. Appl. No. 13/431,444 dated Jul. 8, 2014, 20 pgs.

Reply Non-Final office Action cited in U.S. Appl. No. 13/431,444 dated Oct. 8, 2014, 10 pgs.

Notice of Allowance cited in U.S. Appl. No. 13/431,444 dated Nov. 6, 2014, 28 pgs.

* cited by examiner

LOCATING A MOBILE DEVICE

BACKGROUND

Many computing devices are portable, and many mobile devices may be interactive with a user's surroundings. For example, a mapping application running on a user's mobile device (e.g., smartphone) may allow the user to identify their approximate location on a map displayed on the mobile device. Further, points of interest, retails establishments, entertainment venues, and more, can be indicated on such a map, for example, which can be searched for, and/or identified as the user moves through an area. Typically, mobile devices use global positioning systems (GPS), which utilize satellite triangulation, or some sort of signal triangulation (e.g., mobile phone signal) to identify the approximate location of the user. This location information can be used by various applications on the user's device (e.g., with the user's consent), such as to locate the user on a map, provide appropriate and relevant local information, identify the user's location for social networking, interact with local devices/services, and/or to provide a rich, interactive experience for the user.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Current global positioning systems (GPS) and/or other location identification services used on mobile devices may not provide needed fidelity for some user-experiences, such as applications running on the mobile device, and/or information provided to mobile device data providers. For example, while the GPS can provide a relative position of the user to a mapped point, GPS-type location tracking loses reliability when a mobile device is inside a building or under cover (e.g., parking garage). Even in optimal conditions, a GPS may not be able tell that the user is inside a particular building, standing in front of a particular display in a store, etc. Further, as an example, an approximate position of a user provided via mobile signal triangulation may not meet granularity requirements to sufficiently locate the user, such as for identifying a location of the user from several potential/overlapping locations.

Other current or previous wireless technologies for mobile device location may utilize respective signal strengths detected by the mobile device from one or more wireless access points (APs). However, these technologies need to do extensive site surveys to collect radio signatures, which may quickly become unusable if the indoor environment changes (e.g., due to renovation, and/or AP location change). Further, these technologies typically rely on an ideal path loss model, which is very difficult to properly utilize in an indoor environment. Additionally, these types of technologies are not typically scalable in a manner that allows the device location to be determined efficiently in a cloud based environment.

Accordingly, among other things, one or more techniques and/or systems are disclosed for locating a mobile device, for example, where GPS and/or mobile signal triangulation may not be sufficient (e.g., indoors and/or where a more accurate position is desired), and where site surveys may not be necessary. Local, known access points, such as wireless access points used for network access (e.g., WiFi) may be utilized to more accurately identify a location of a user's mobile device. For example, a signal strength received by one or more APs in an area, from the mobile device, can be used to identify an estimated distance between the respective one or more APs and the mobile device. Further, in this example, the estimated distance(s) may be compared with a known distance between the access point(s) and respective grid spaces, comprised in a gird overlaying an area, to determine a grid space likelihood score. A particular grid space that comprises a desired (e.g., indicating most likely) grid space likelihood score may be selected as the location of the mobile device.

In one embodiment of identifying a location of a mobile device, a first signal distance between a first grid space and a first access point (AP) can be determined using a first received signal strength (RSS). The first RSS may comprise an indication of mobile device signal strength received by the first AP. Further, a first grid space likelihood score for the first grid space can be determined by comparing the first signal distance with a first grid space distance. The first grid space distance may comprise a known distance between the first AP and the first grid space. Additionally, the mobile device location can be identified based at least on the first grid space likelihood score.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

DETAILED DESCRIPTION

Figure 1:
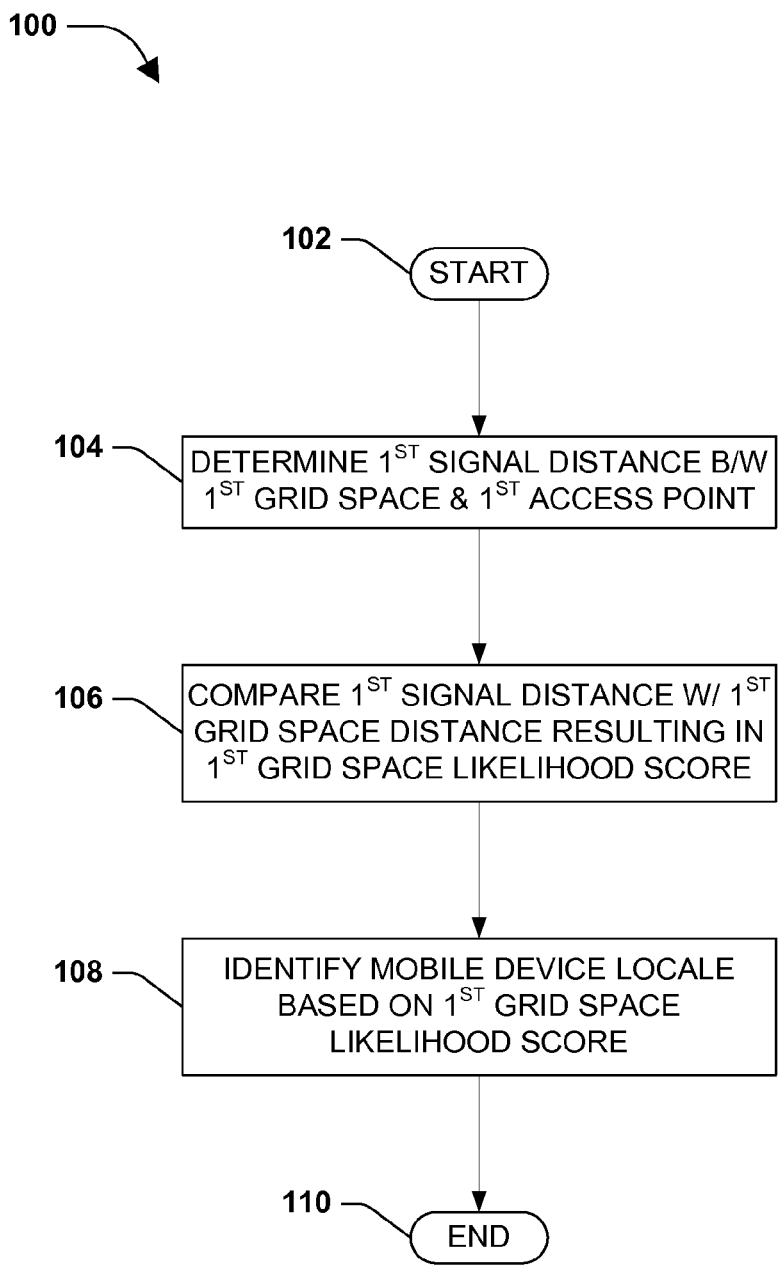
FIG. 1 is a flow diagram illustrating an exemplary method for identifying a location of a mobile device.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

As provided herein, a method may be devised that provides for locating a mobile device, such as inside a building. Whereas global positioning systems (GPSs) tend to stop working properly indoors, one or more local wireless transmission sites (e.g., wireless access points (WAPs)) may be used to provide an accurate, reliable location of the mobile device. Further, a location service may be able to remotely (e.g., cloud-based) identify the mobile device using signals received from the mobile device by the one or more wireless transmission sites (e.g., provided a user consents to the same). An area, such as a floor of a building, may be broken down into a grid, based on a location on the one or more APs, where a distance between respective grid spaces (e.g., squares) and respective one or more wireless transmission sites is known. Received signal strengths (RSSs) of received transmissions can be used in combination with the known distances, for example, to identify where the mobile device is located in the area.

FIG. 1 is a flow diagram illustrating an exemplary method 100 for identifying a location of a mobile device. The exemplary method 100 begins at 102. At 104, a first signal distance between a first grid space and a first access point (AP) is determined using a first received signal strength (RSS). The first RSS comprises an indication of signal strength from the mobile device, received by the first AP. As one example, an area in which the mobile device (e.g., smartphone) may be located can comprise a grid dividing the area into one or more grid spaces, comprising at least the first grid space and the (e.g., unknown) location of the mobile device. In this example, a location of the first grid space (e.g., and a second grid space and a third grid space, etc. of the grid) may be known. For example, a floor of a building may comprise a rectangular shape, over which can be laid a grid made up of sixty grid spaces (e.g., a grid having ten columns and six rows).

As another example, a RSS may be used to identify an estimated distance between a receiver of the RSS and a transmitter of the RSS. In one embodiment, the transmitter of the first RSS can comprise the mobile device and the receiver of the first RSS can comprise the first AP (e.g., and a second AP, third AP, etc.). For example, the first RSS, comprising an indication of signal strength from the mobile device, may have been received by the first AP and used to determine the first signal distance by estimating the distance between the transmitter (e.g., the mobile device) and the receiver (e.g., the first AP). In one embodiment, the mobile device may periodically (e.g., or continuously, or on-demand, etc.) transmit data packets, which can be detected and received by one or more APs within reception range.

Further, as one example, a location of the mobile device may be unknown when determining the signal distance. In this example, the first grid space/square may be used as a "potential" location of the mobile device (e.g., at a time of data packet transmission), and the first signal distance can comprise the estimated distance (e.g., determined using the first RSS) between the first grid space and the first AP, as if the mobile device was located in the first grid space.

At 106 in the exemplary method 100, a first grid space likelihood score is determined for the first grid space by comparing the first signal distance and a first grid space distance. The first grid space distance comprises a known distance between the first AP and the first grid space. As one example, a location of the respective grid spaces in a grid, such as overlaying an area (e.g., a floor of a building), can be known. Further, for example, a location of the first AP (e.g., and other APs if present) may be known. In this way, a distance between the first grid space and the first AP may also be known, comprising the first grid space distance.

In one embodiment, the first grid space likelihood score may be determined by combining the first signal distance and a first grid space distance using a grid-space scoring formula. As one example, a difference between the first signal distance and a first grid space distance can be calculated (e.g., normalizing a result of subtracting the signal distance from the grid space distance), and the distance difference may be used as an input to the grid-space scoring formula. In this example, the result of the inputting the distance difference may comprise a likelihood value (e.g., a percentage, absolute value, etc.), indicating a likelihood that the mobile device is located in the corresponding grid-square (e.g., the first grid square).

At 108 in the exemplary method 100, the mobile device location may be identified based at least on the first grid space likelihood score. As one example, if a grid space likelihood score represents a likelihood that the mobile device is located in the corresponding grid-space, the grid-space comprising a highest (e.g., highest percentage of likelihood) grid score may be selected as most likely to comprise the location of the mobile device. For example, a grid space likelihood score may be determined for respective sixty grid-spaces comprised in a grid (e.g., a six by ten grid) overlaying an area (e.g., a floor of a building). In this example, the grid-space of the sixty spaces that comprises a desired grid score (e.g., highest) may be selected as the location of the mobile device.

Having identified the mobile device location, the exemplary method 100 ends at 110.

Figure 2:
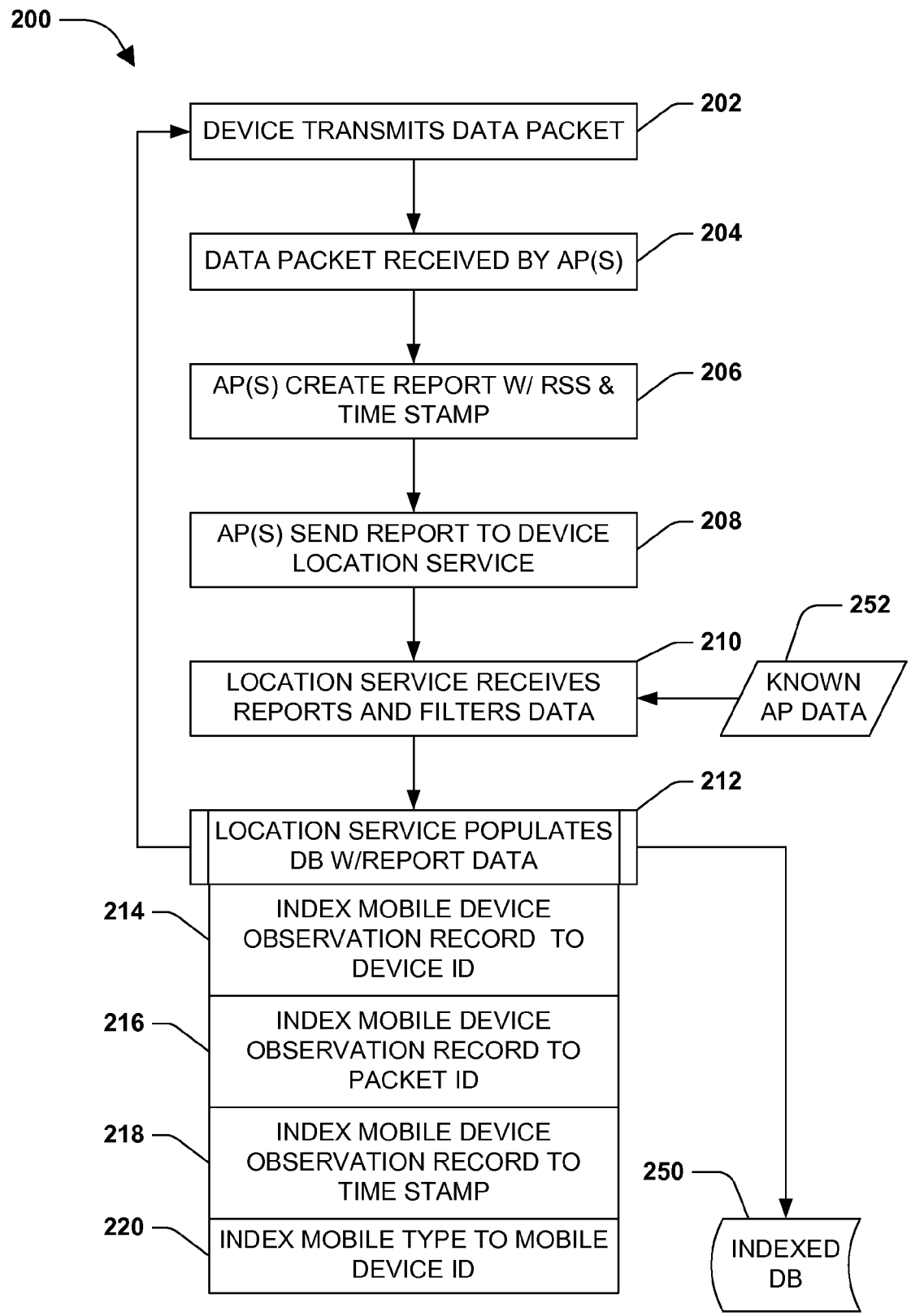
FIG. 2 is a flow diagram illustrating an example embodiment where one or more portions of one or more techniques described herein may be implemented.

FIG. 2 is a flow diagram illustrating an example embodiment 200 where one or more portions of one or more techniques described herein may be implemented. In the example embodiment 200, a mobile device may transmit a signal comprising a data packet (e.g., a first signal comprising a first data packet). At 204, one or more APs that are located within signal reception range may receive the signal comprising the data packet. As one example, an AP may comprise at least a receiver that receives signals from mobile devices for wireless communication with wireless configured devices. For example, an access point may comprise a WAP used to connect to a network (e.g., the Internet), a device locator beacon, a cell site (e.g., for mobile phones), etc.

As one example, the mobile device may periodically transmit a data packet (e.g., the first data packet, a second data packet, etc.), such as for device location purposes, for mobile data updates, and/or to connect with a local wireless access point (e.g., on-demand, such as when a user of the mobile device wishes to get a current location, for example). In this example, the one or more APs within reception range can receive the transmitted data packets from the mobile device. As another example, a plurality of mobile devices may be periodically transmitting data packets in an area (e.g., on-demand, to get a current location, for example), which may respectively be received by respective local APs (e.g., the first AP, a second AP, etc.) in the reception area.

At 206 in the example embodiment 200, a mobile device signal report may be created, where the signal report can comprise a received signal strength (RSS) for the signal comprising the data packet, and (optionally) a time stamp indicating a time of reception of the signal. As one example, the AP (e.g., first AP) may determine the RSS (e.g., first RSS) based on an indication of signal strength of the received signal (e.g., decibels per milliwatt (dBmW) recorded by the AP at time of reception). Further, as one example, the AP may record a time of signal reception, and create a time stamp corresponding the RSS.

Additionally, in one embodiment, the data packet may comprise a data packet identifier (ID) (e.g., a thirty-two bit number that is incremented and assigned to respective new data packets transmitted by the mobile device). In this embodiment, for example, the report may comprise the data packet ID (e.g., in lieu of or as well as the time stamp) for the data packet comprised in the signal. For example, a time stamp may be used to identify a particular time for the RSS, and a data packet ID may be able to identify a more recent RSS (e.g., based on the incremented number, where a larger number may indicate a more recent RSS).

In one embodiment, the mobile device signal report may comprise a mobile device ID, for example, which can specifically identify the mobile device that sent the signal. Further, the mobile device signal report may comprise transmission power data that indicates a transmission power of the mobile device (e.g., a transmission strength in dBmW (e.g., which may be obtained from a data packet sent from the mobile device)); a mobile device type (e.g., a device platform, operating system, applications, etc.); an AP identifier (ID) that particularly identifies the AP receiving the signal; and/or a location (e.g., coordinates, building address and floor, location in building, etc.) of the AP that received the signal.

At 208 in the example embodiment 200, the mobile device signal report can be sent to a device location service. As one example, the device location service may comprise a remote (e.g., cloud-based) service that can be used to identify the location of the mobile device). At 210, the device location service may receive the report and filter data in the report. As one example, one or more reports sent from an unknown AP may be filtered (e.g., screening out RSS data that corresponds to an unknown AP). As one example, if an AP is unidentified (e.g., no corresponding AP ID) a location of the unidentified AP may also be unknown (e.g., which may prevent determining a known distance). Further, if no AP location data is provided, a location of the AP may also be unknown, also justifying discarding/filtering corresponding RSS data. By way of example, an unknown AP may correspond to an AP for which an AP ID is not linked to or listed in known AP data 252 and/or an AP for which an AP location is unavailable in known AP data 252. It may be appreciated that one or more AP databases may comprise known AP data 252, which may be used to screen out the mobile device report(s) from one or more unknown APs.

At 212, the device location service may populate the information in the mobile device signal report to an indexed database 250. As on example, the database 250 may store mobile device observation records. For example, a mobile device observation record may comprise information indicating a particular AP that received a particular signal from a particular mobile device at a particular strength at a particular point in time, etc. A mobile device observation record may comprise, for example, a mobile device ID, a packet ID, a timestamp, a RSS, a transmission power, an AP ID, an AP location, and/or device type, etc.

As one example, at 214, a mobile device observation record, comprising the RSS, may be indexed to the mobile device ID, such that the mobile observation record (e.g., and the RSS) may be identified by the mobile device ID. At 216, the mobile device observation record (e.g., comprising the RSS) can be indexed to the packet ID, such that the mobile device observation record (e.g., and the RSS) may be identified by the packet ID (e.g., selecting a most recent RSS) and/or the mobile device ID. At 218, the mobile device observation record (e.g., comprising the RSS) may be indexed by the time stamp, such that the mobile device observation record (e.g., and the RSS) may be identified by the time stamp (e.g., select RSS between time A and time B), the packet ID and/or the mobile device ID. At 220, the mobile device type may be indexed to the mobile device ID, such that the mobile device type may be identified by the mobile device ID. It will be appreciated, however, that these are merely a few indexing options and that the instant application, including the scope if the appended claims, is not intended to be so limited (e.g., fewer or more indexing criteria are contemplated).

As one example, the data comprised in the mobile device signal report may be populated and indexed in the indexed database 250. Further, returning to 202, the mobile device may transmit another signal comprising another data packet (e.g., a second signal comprising a second data packet), which may be received by the one or more APs, at 204. Further, a second report may be created and sent to the device location service, where the mobile device signal information may populated (e.g., updated) into the indexed database 250). The flow loop 202 to 212 may iterate, for example, at least until the mobile device is out of reception range of the APs, and/or no mobile devices are within reception range of the APs, for example.

Figure 3:
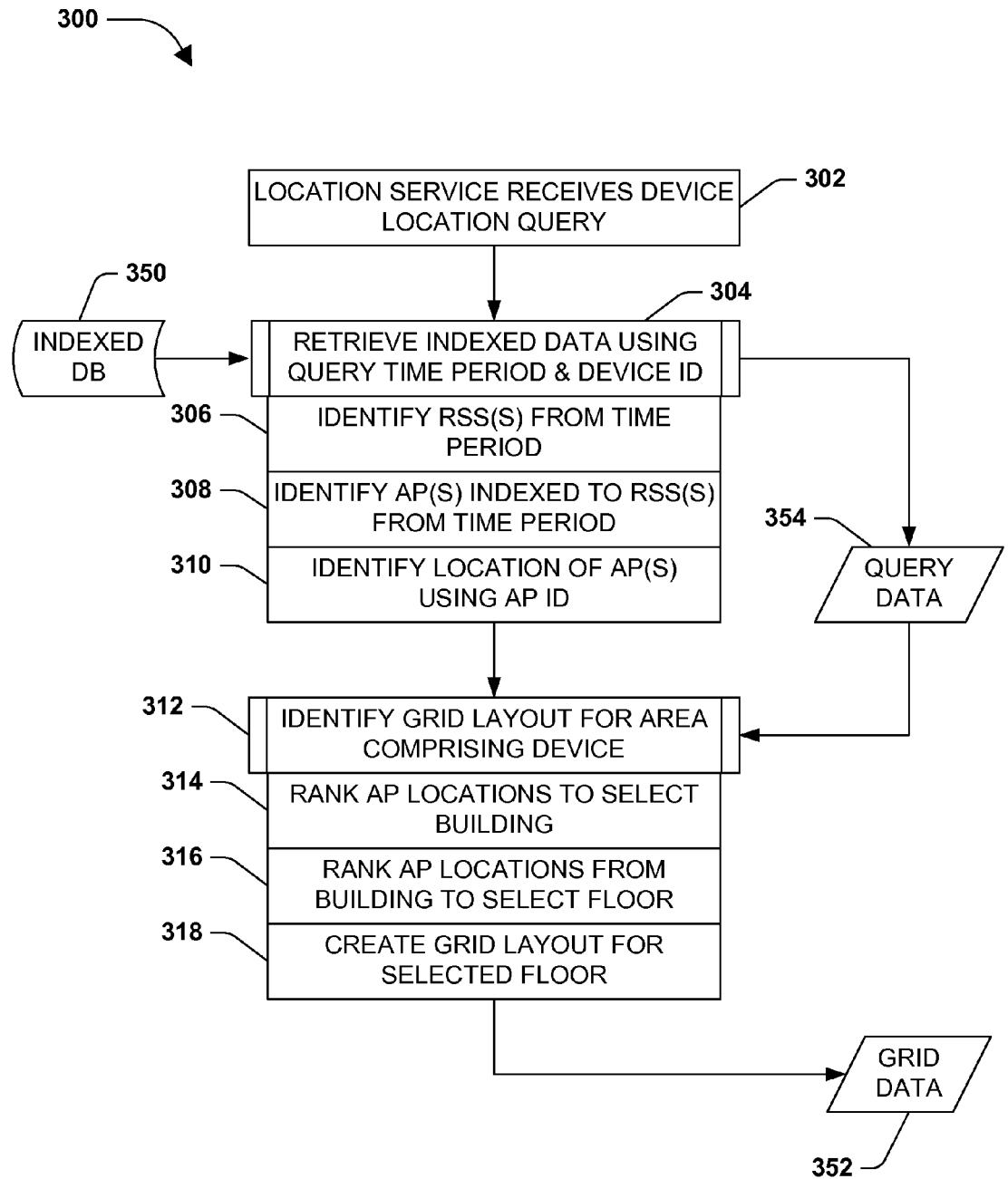
FIG. 3 is a flow diagram illustrating an example embodiment where one or more portions of one or more techniques described herein may be implemented.

FIG. 3 is a flow diagram illustrating an example embodiment 300 where one or more portions of one or more techniques described herein may be implemented. In the example embodiment 300, grid data 352 may be provided/generated that indicates a grid area (e.g., a floor of a building), respective grid squares, and associated grid square locations. At 302 in the example embodiment 300, a device location service receives a device location query. As one example, the device location service may receive a query from an application resident on the mobile device (e.g., from the device and/or from a remote service communicating with the application) to identify the device's location, where the device has been enabled to identify the device location by a user of the device, for example.

In one embodiment, the location query may comprise a mobile device ID that is particular to merely one mobile device, and a desired time period for the device location (e.g., where was device X at time Y). As one example, the location request may comprise a request to identify a most recent location of the particular mobile device. As another example, the location request may ask to identify the device location during a time period, between time A and time B (e.g., between now and the next few seconds, as longer periods may produce undesired results when devices are moving).

At 304, the mobile device ID and desired time period from the location query may be used to retrieve indexed query data 354 from an indexed database 350 (e.g., 250 of FIG. 2). At 306, one or more RSSs from the mobile device during the desired time period may be identified using the mobile device ID and desired time period. Further, at 308, an AP ID for the AP that reported the RSS, for the respective one or more RSSs, may also be identified. Using the AP ID, a location of the AP may be identified in the indexed database, at 310.

At 312, a desired grid layout for an area comprising the mobile device may be identified, using the indexed query data 354. In one embodiment, the desired grid layout can comprise a physical area that comprises the first grid space (e.g., and second grid space, and third, etc.) at a known location and the location of the mobile device (e.g., although unknown). At 314, identifying the desired grid layout for the area can comprise ranking and/or aggregating the one or more identified APs to select a building. As one example, the AP location identified for the one or more APs can be used to aggregate or rank the APs in a particular building. For example, the APs may be ranked based on a distance away from an aggregation center (e.g., using AP density to create the aggregation center). As one example, a first AP in the ranking may comprise a closest location to the aggregation center, a second RSS (e.g., next) in the ranking may comprise a next-closest AP location, and so-on.

In one embodiment, a top "K" AP locations (e.g., where K indicates a number of desired APs used) may be selected from the ranking for subsequent filtering (e.g., if desired). In one embodiment, merely those AP locations that meet a desired AP distance threshold (e.g., within a desired distance from the aggregation center) may be selected for further processing. As one example, the one or more AP locations selected may be associated with APs that are located in a building in which the mobile device may reside. That is, for example, merely those APs that are close enough may be selected as likely to be located in the same building as the mobile device (e.g., filtering out APs in other buildings and/or outside).

At 316 in the example embodiment 300, identifying the desired grid layout can comprise aggregating/ranking the APs to select a floor location (e.g., or a portion thereof), in the selected building, for the mobile device. As one example, the one or more AP locations selected for the building may be further aggregated and subsequently ranked to select a particular floor (e.g., or portion thereof) in the building (e.g., based on a top K AP locations, and/or an distance threshold indicative of the floor locality).

At 318 in the example embodiment 300, having selected a candidate area (e.g., floor, or portion thereof), that potentially comprises the location of the mobile device, a grid can be created, resulting in grid data 352 for the candidate area, which may be used to overlay the selected candidate area. As one example, the candidate area may be selected based at least on the ranked and selected AP locations, respectively corresponding to one or more APs (e.g., located in the candidate area), which have been filtered by building, and/or by floor. In this example, the grid can be created to comprise the selected candidate area, where the grid may comprise a location of the mobile device.

Figure 6:
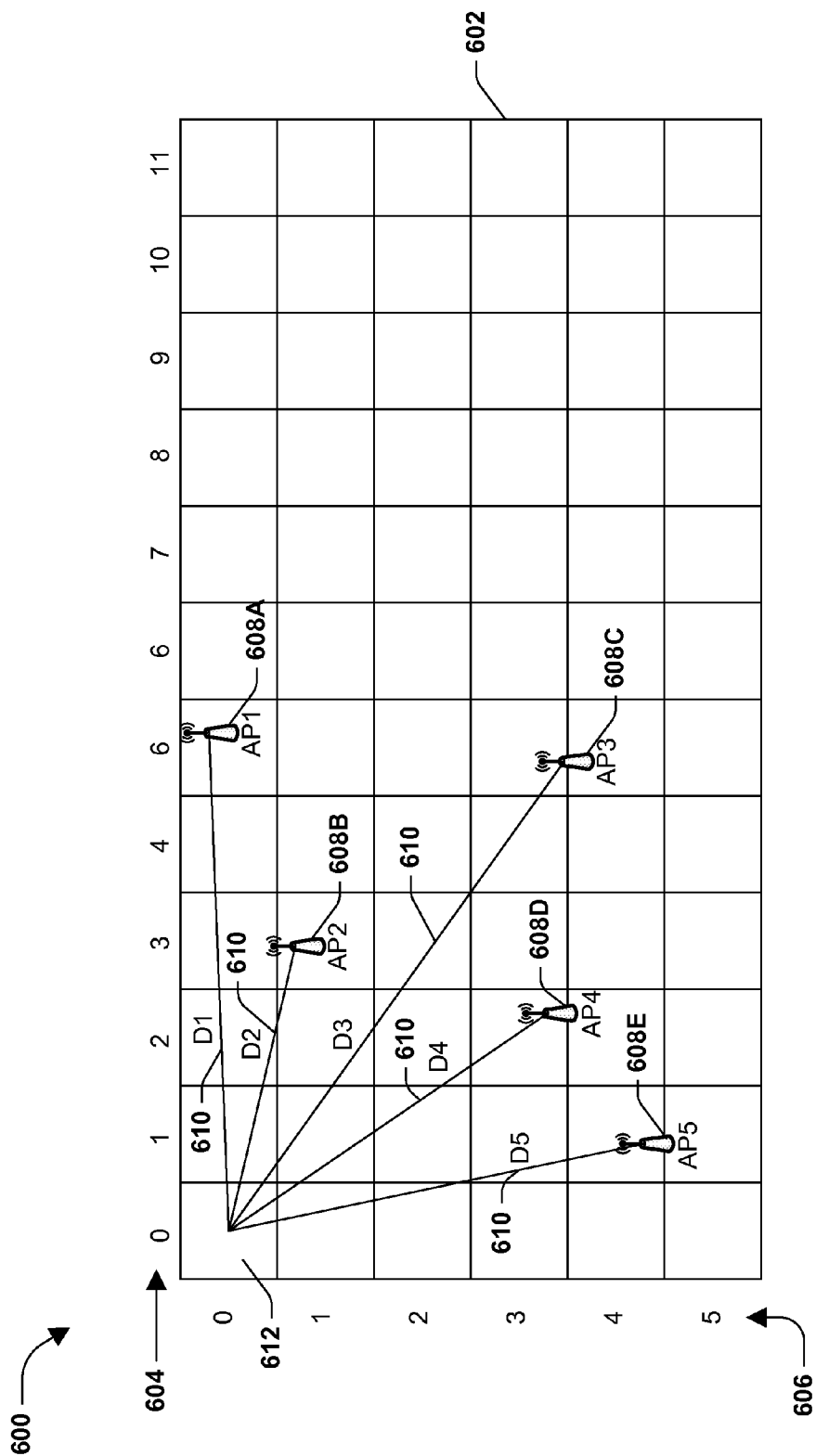
FIG. 6 illustrates an example embodiment where one or more portions of one or more techniques described herein may be implemented.

Further, the created grid can comprise one or more grid spaces, for example, respectively corresponding to a grid coordinate and, therefore, a known location relative to the candidate area. As an illustrative example, FIG. 6 illustrates an example embodiment 600 where one or more portions of one or more techniques described herein may be implemented. In the example embodiment 600, a grid 602 comprises column coordinates 604 and row coordinates 606, respectively corresponding to a grid space, such as first grid-space 612. As one example, the grid 602 may correspond to (e.g., in size and shape) the candidate area, such as a selected floor of a selected building. In this example, the first grid-space 612 (e.g., as well as other grid-spaces in the grid 602) can correspond to a known location in the candidate area.

In one embodiment, the query data 354 may be filtered to generate grid query data. In this embodiment, for example, the grid query data may comprise the IDs of the one or more APs that are identified in the candidate area. In this manner IDs of (extraneous) APs that are not within the candidate area may be removed. It may be appreciated that this can lead to more efficient processing as fewer calculations, operations, etc. may need to be performed as extraneous APs may not be considered.

Figure 4:
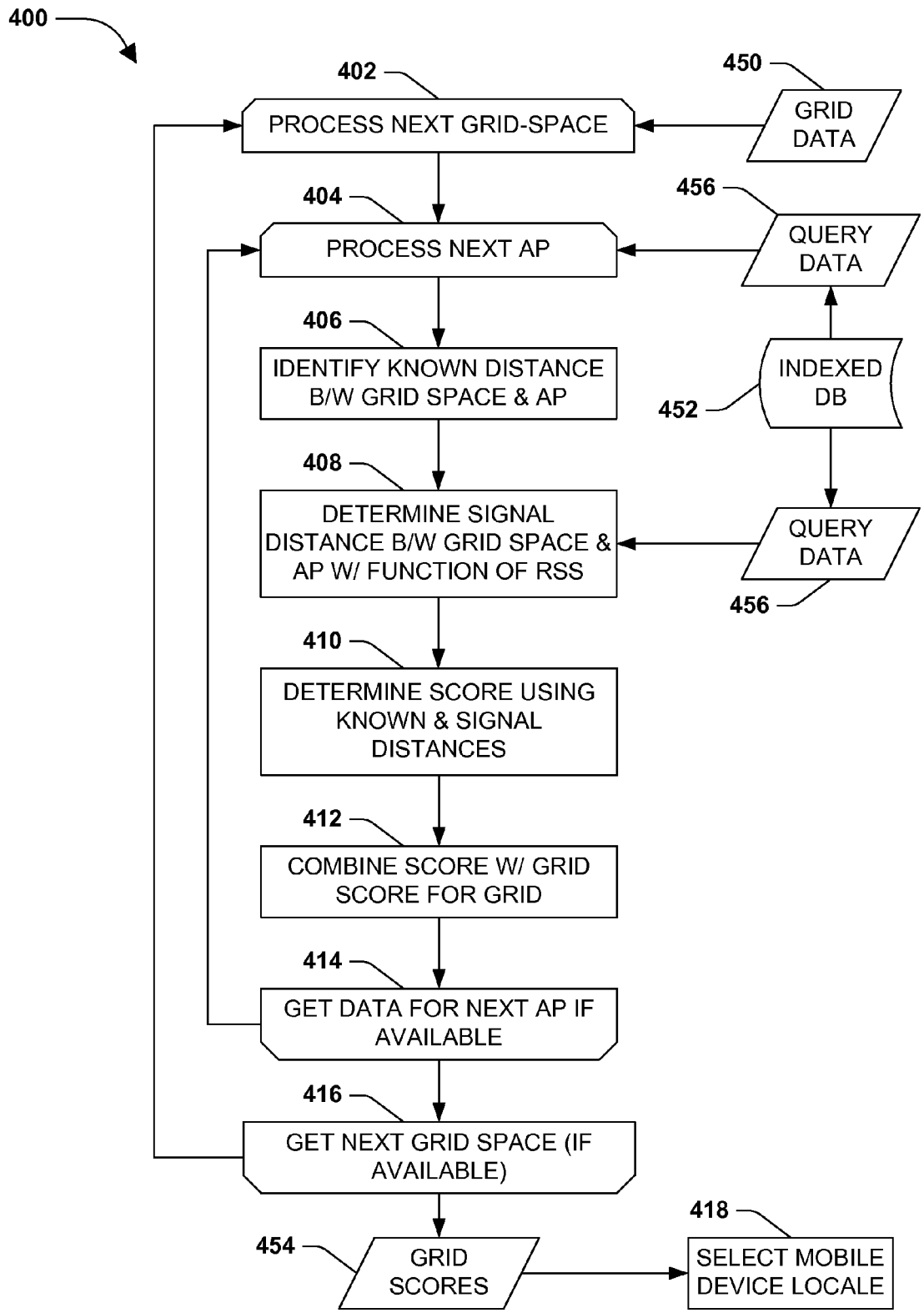
FIG. 4 is a flow diagram illustrating an example embodiment where one or more portions of one or more techniques described herein may be implemented.

FIG. 4 is a flow diagram illustrating an example embodiment 400 where one or more portions of one or more techniques described herein may be implemented. In this example embodiment 400, grid data 450 (e.g., 352 of FIG. 3) for a selected candidate area (e.g., potentially comprising a location of a mobile device), and indexed query data 456 (e.g., 354 of FIG. 3 (e.g., potentially comprising grid query data that excludes extraneous APs) comprising RSS data, AP location, transmission power, etc. may be used to identify a location of the mobile device (e.g., in the candidate area), where the indexed query data may be retrieved from an indexed database 452 (e.g., 350 of FIG. 3).

At 402, a next unprocessed grid-space (e.g., the first grid-space) from the grid data 450 may be selected. As one example, respective grid-spaces in the grid (e.g., 602 of FIG. 6) may be processed to identify a grid-score for the respective grid-spaces, starting with the first grid-space (e.g., 612 of FIG. 6). For example, processing a next grid-space may comprise selecting a grid-space from the grid, for which no grid-score has been determined.

At 404, a next, unprocessed AP can be selected for processing, for the selected grid space. As an illustrative example, in FIG. 6, the selected candidate area (e.g., comprising the grid 602) may comprise a plurality of APs 608 (A-E). In this example, for the first grid-space 612, the respective APs 608 may be processed (e.g., starting with a first AP 608A) to determine the grid score for the first grid-space 612.

Returning to FIG. 4, at 406, a first known distance between the first grid space and the first AP can be identified, resulting in the first grid-space distance. As an illustrative example, in FIG. 6, a location of the first AP 608A may be known from indexed query data (e.g., 456 of FIG. 4 (e.g., potentially comprising grid query data that excludes extraneous APs), linking the AP ID to the AP location), and the location of the first grid-space is known (e.g., based on the grid data 450 of FIG. 4). Therefore, in this example, the first grid-space distance 610A can be determined based on the known location of the first AP 608A and the known location of the first grid-space 612 (e.g., from a center of the first grid-space).

Returning to FIG. 4, at 408, a first signal distance (e.g., estimated distance) between the first grid space and the first AP can be determined, using a function of RSS applied to a first RSS. Here, the first RSS can be comprised in the indexed query data 456 (e.g., potentially comprising grid query data), received from the mobile device signal report (e.g., at 210 of FIG. 2). The first RSS may be indicative of a strength of a signal sent from the mobile device and received by the first AP (e.g., 608A of FIG. 6). In one embodiment, the function of RSS applied to a first RSS may comprise a base path loss function. A path loss function, for example, may be indicative of a relationship between power density for a signal as distance between the transmitter and receiver increases given a same transmission power used by respective transmitters (e.g., as a signal's electromagnetic wave propagates over a greater distance of space the power density may decrease).

In one embodiment, when respective transmitters may not be using a same transmission power, a function of signal attenuation (e.g., instead of RSS) can be applied to a first signal attenuation, for example, computed from transmission power of the mobile device and the first RSS. The function of signal attenuation applied to the first signal attenuation may, for example, comprise a base path loss function which may be indicative of a relationship between power attenuation for a signal as distance between the transmitter and receiver increases. The transmission power of the mobile device may, for example, be embedded in a data packet sent from the mobile device and received by one or more surrounding APs (e.g., within reception distance). As another example, the transmission power may be determined by a query to a database that stores respective transmission powers used by one or more different types of mobile devices.

In one embodiment, where a path loss theory model may be used to develop the path loss function, an ideal relationship between received signal strength and distance may not be necessary. As one example, one or more wireless access points (e.g., IEEE 802.11 APs, and/or other wireless technologies) may be distributed around a given mobile device, and the path loss function may be applied to accumulated statistical information (e.g., a plurality of RSSs, respectively received by different APs) for inferring a mobile device's indoor location. In this embodiment, for example, applying the path loss function to the first RSS may result in the first signal distance between the first grid-space and the first AP.

At 410 in the example embodiment 400, a first AP score for the first grid-space can be determined, using a first grid space distance (e.g., a known distance between the first AP and the first grid space) and the first signal distance. As one example, a scoring function may be used to generate the first AP score for the first grid-space, such as by using the first grid space distance and the first signal distance as input to the scoring function, resulting in an output comprising the first AP score for the first grid-space. For example, the scoring function may identify a difference between the first grid space distance and the first signal distance, and/or may apply a score weighting factor based on the RSS for the mobile device received by the first AP.

At 412, the first AP score for the first grid-space may be combined with the grid score for the first grid space. As one example, a grid space likelihood score for the first grid space may be initially set to zero (e.g., as the first AP is the first one processed to generate an AP score for the first grid space), and the first AP score can be combined with zero (e.g., summed with) to generate the grid space likelihood score for the first grid-space (e.g., at least a first grid score for the first grid-space).

At 414, if another unprocessed AP is indicated for the first grid-space, a second AP may be processed for the first grid-space, at 404. In one embodiment, at 406, a second grid space distance may be identified between a second AP and the first grid-space, based at least on the indexed query data 456 (e.g., comprising the known location of the second AP) and the grid data 450 (e.g., comprising the known location of the first grid-space). Further, at 408, a second signal distance can be determined between the first grid space and the second AP using a second RSS. The second RSS can comprise an indication of signal strength for a signal transmitted from the mobile device and received by the second AP. As one example, the base path loss function may be applied to the second RSS to determine the second signal distance.

At 410, a second AP score can be determined for the first grid-space, using a combination of the second grid space distance and the second signal distance. As one example, the scoring function may be used to determine the second AP score, where the second grid space distance and the second signal distance (e.g., and the second RSS) comprise the inputs, and the second AP score for the first grid-space comprises the output. At 412, the second AP score for the first grid-space can be combined with the present or existing score for the first grid space, or the first grid-space grid-score (e.g., comprising at least the first AP score), resulting in an updated first grid-space grid space likelihood score (e.g., comprising a combination of the first AP score and the second AP score).

As one example, in the example embodiment 400, the procedural loop of 404 to 414 may be iterated at least until respective APs have been processed for the first grid-space. That is, for example, respective APs that are identified as corresponding to the aggregated and ranked AP locations (e.g., as described in FIG. 3) in the candidate area, may be processed for the first grid-space. As an illustrative example, in FIG. 6, five APs 608 (A-E) are identified as comprised within the candidate area (e.g., floor of a selected building) comprising the grid 602. In this example, an AP score may be determined for the respective APs 608, based at least upon their respective grid space distances 610 (A-E), and signal distances determined by an associated RSS (e.g., received by the AP from the mobile device). The respective AP scores can be combined to determine the grid space likelihood score for the first grid-space 612.

Returning to FIG. 4, at 416, if a next unprocessed grid-space is present, a second grid-space may be processed at 402. As one example, the procedural loop of 404 to 414 may be iterated at least until respective APs (e.g., comprising the same APs as were processed for the first grid-space) have been processed for the second grid-space. Further, the respective AP scores can be combined, at 412, to determine the grid space likelihood score for the second grid-space. Additionally, the procedural loop of 402 to 416 may be iterated at least until respective grid-spaces in the grid have been processed, for example, resulting in a grid space likelihood score 454 for the respective processed grid-spaces. As an illustrative example, in FIG. 6, the respective sixty grid spaces in the grid 602 may be processed, comprising processing the respective APs 608 (A-E) for the respective grid-spaces.

Returning to FIG. 4, at 418, a location of the mobile device may be identified by selecting a grid-space that comprises a desired grid space likelihood score 454 (e.g., one that meets mobile device location criteria). As one example, a grid space that comprises a highest probability (e.g., indicated by the grid space likelihood score) of comprising the location of the mobile device may be selected. As one example, a highest grid space likelihood score may comprise a highest probability, where the grid space distance/signal distance combination (e.g., difference) for the respective one or more APs of a grid-space is lowest (e.g., the grid space and signal distances are similar, indicating that the mobile device sent the signals from a similar location identified by the grid space distance).

In one aspect, the base path loss function may be calibrated for a mobile device and used to determine the grid score for a grid-space. As one example, the base path loss function (e.g., based on a theoretically ideal model) may be used for a set of initial grid score determinations. However, a real-world environment (e.g., indoor environment) may alter electromagnetic signals transmitted by a mobile device, and/or different mobile devices may transmit signals in different ways and/or at different transmission powers, thereby adjusting a signal strength received from what may be "ideally" expected. In one embodiment, in this aspect, the base path loss function may be calibrated for an AP resulting in an AP path loss function. As one example, the AP path loss function may indicate a relationship between a distance from the AP to the mobile device and the RSS or signal attenuation for the mobile device signal received by the AP. Further, in this embodiment, a signal distance (e.g., the first signal distance) can be determined by combining the RSS (e.g., or signal attenuation) for the mobile device (e.g., the first RSS, or a first signal attenuation) with the AP path loss function.

Figure 5:
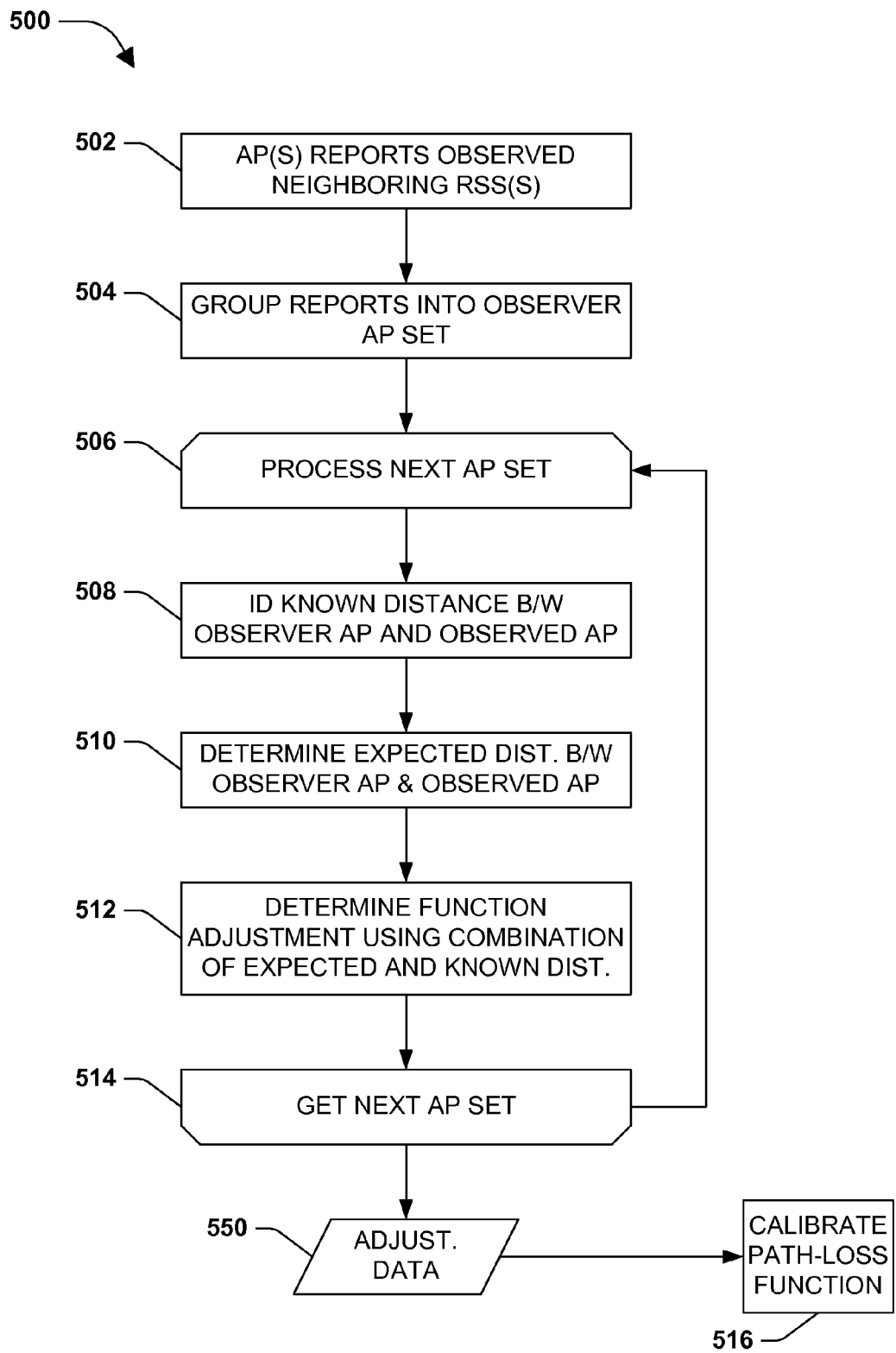
FIG. 5 is a flow diagram illustrating an example embodiment where one or more portions of one or more techniques described herein may be implemented.

FIG. 5 is a flow diagram illustrating an example embodiment 500 where one or more portions of one or more techniques described herein may be implemented. In the example embodiment 500, for example, a base path loss function may be calibrated for respective one or more APs identified for a candidate area comprising a grid. At 502, a first AP (e.g., an observer AP) reports an observed RSS (e.g., or signal attenuation) for a second AP (e.g., a signal strength and/or signal attenuation for a signal transmitted from the second AP and received by the first AP). Further, as an example, the first AP may also report an observed RSS and/or signal attenuation from a third AP (e.g., and a fourth AP, a fifth AP, etc. comprising observed APs), resulting in a set of one or more observed RSSs (e.g., or signal attenuations) for the first AP (e.g., for signals received at the first AP from the second AP, third AP, fourth AP, etc.).

At 504, the one or more reports (e.g., from respective observer APs) may be grouped into observer AP sets, respectively corresponding to an AP (e.g., the first AP, second AP, etc.) identified for the candidate area comprising the grid. As one example, an observer AP set for the first AP may comprise an RSS and/or signal attenuation report for signals sent by a second AP, third AP, fourth AP, and fifth AP and received by the first AP; while an observer AP set for the second AP may comprise an RSS and/or signal attenuation report for signals sent by the first AP, third AP, fourth AP, and fifth AP and received by the second AP. At 506, a next unprocessed observer AP set can be processed (e.g., the first AP set).

At 508, a known distance between the observer AP (e.g., the first AP, receiving the signal from the second AP) and the observed AP (e.g., the second AP, sending the signal) may be identified. As one example, the known distance may be identified using grid AP data (e.g., 352 of FIG. 3), which may identify a location of respective APs. At 510, an expected distance can be determined using the RSS reported by the observer AP in the observer AP set (e.g., using a base path loss function).

At 512, the base path loss function adjustment may be determined, using at least a combination of the known distance between the observed and observer APs and the expected distance between the observed AP (e.g., second AP) and the observer AP (e.g., first AP). Further, if the observer AP set for the first AP comprises a plurality of reports (e.g., for the second AP, third AP, etc.), a final base path loss function adjustment for the first AP may comprise a combination of corresponding base path loss function adjustments (e.g., base path loss function adjustment based upon report(s) for second AP, base path loss function adjustment based upon report(s) for third AP, and base path loss function adjustment based upon report(s) for fourth AP, etc.). In one embodiment, resulting adjustment data 550 for the first AP may be used to calibrate the base path loss function, at 516, resulting in a first calibrated path loss function (e.g., used merely for the first AP).

In the example embodiment 500, the procedural loop 506 to 514 may be iterated for respective observer AP sets (e.g., observer AP set for first AP, observer AP set for second AP, observer AP set for third AP, etc.). That is, for example, resulting adjustment data 550 for respective one or more APs may be used to calibrate the base path loss function, at 516, resulting in one or more calibrated path loss functions, respectively corresponding to a different AP (e.g., used merely for the corresponding AP).

A system may be devised for locating a mobile device, where global positioning systems (GPS) mobile device signal triangulation may not be available (e.g., indoors). Local, known wireless transmitters may be used to identify the location of the mobile device, for example. Further, a remote locator service may be able identify the mobile device location by comparing grid-space (e.g., known) distances with signal distances, using indications of signal strength received by one or more local, known wireless transmitters from the mobile device.

Figure 7:
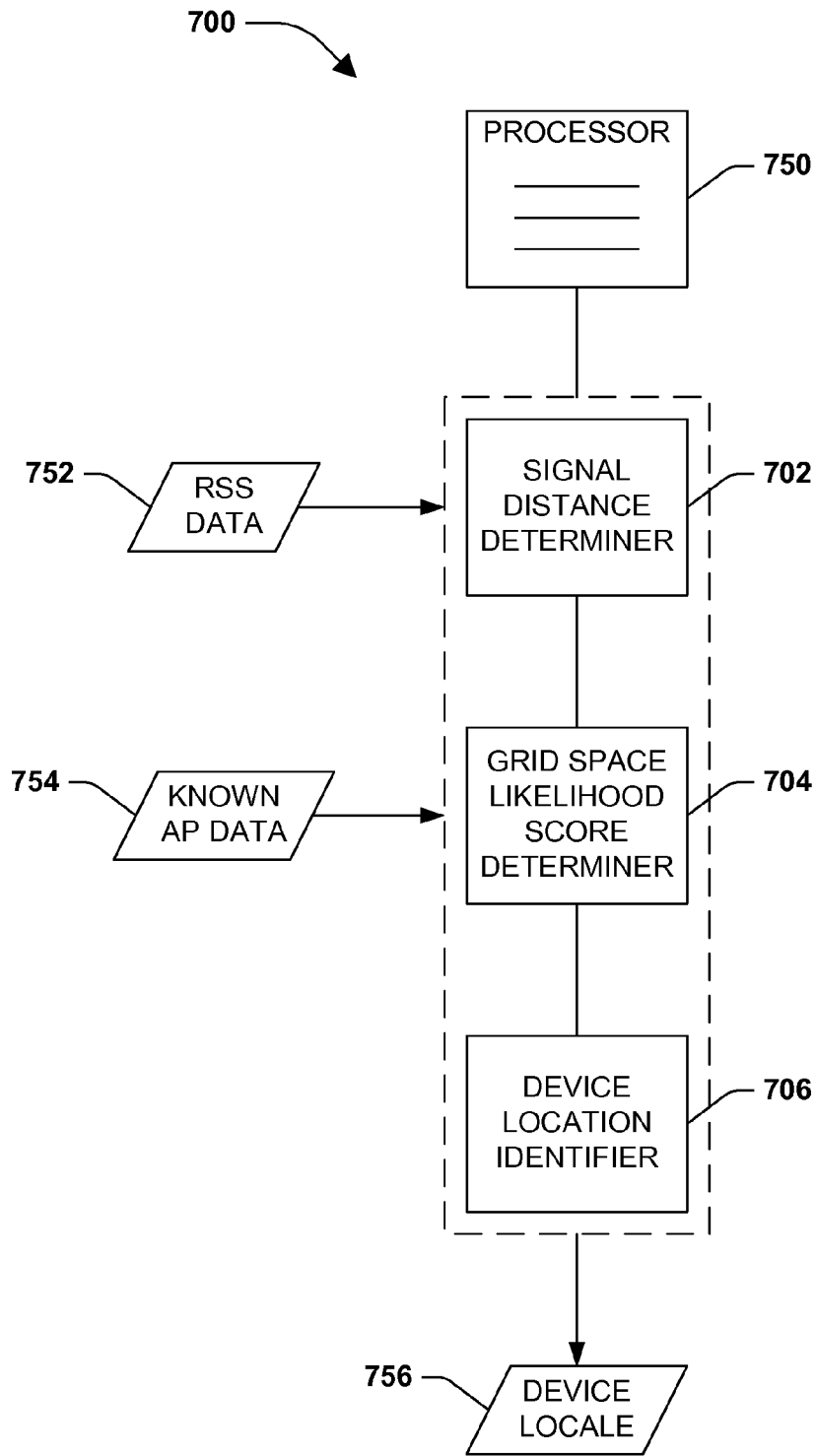
FIG. 7 is a component diagram illustrating an exemplary system for identifying a location of a mobile device.

FIG. 7 is a component diagram illustrating an exemplary system 700 for identifying a location of a mobile device. In the exemplary system 700, a signal distance determination component 702 is configured to determine a signal distance between a grid space associated with mobile device and an access point (AP) using an indication of received of signal strength 752 (RSS) associated with the mobile device. As one example, the signal distance determination component 702 may determine a first signal distance between a first grid space and a first AP using a first RSS, where the first RSS comprises an indication of signal strength for a signal transmitted by the mobile device and received by the first AP. Further, for example, the signal distance determination component 702 may determine a second signal distance between the first grid space and a second AP using a second RSS (e.g., and a third signal distance between the first grid space and a third AP using a third RSS, etc.; and/or a fourth signal distance between a second grid space and the first AP using a fourth RSS; etc.).

In the exemplary system 700, a grid space likelihood score determination component 704 is operably coupled with the signal distance determination component 702. The grid space likelihood score determination component 704 is configured to determine a grid space likelihood score for the grid space based at least on a combination of the signal distance and a grid space distance between the AP and the grid space (e.g., from known AP data 754). As one example, a first grid space distance between the first AP and the first grid space, based on a known location of the first grid-space and the first AP, may be combined with the first signal distance to determine a first grid space likelihood score for the first grid space.

In the example embodiment 700, a device location determination component 706 is operably coupled with the grid space likelihood score determination component 704. The device location determination component 706 is configured to identify the mobile device location 756 based at least on the grid space likelihood score, where at least a portion of the system 700 is implemented, at least in part, using a computer-based processing unit 750. As one example, the device location determination component 706 may compare the first grid space likelihood score for the first grid-space with a second grid space likelihood score for a second grid-space to determine the mobile device location 756. For example, if the first grid space likelihood score comprises a higher probability that the mobile device is located within the first grid-space as compared to the probability of the mobile device being located within the second grid space as indicated by the second grid space likelihood score, the first grid-space may be selected as the location of the mobile device.

Figure 8:
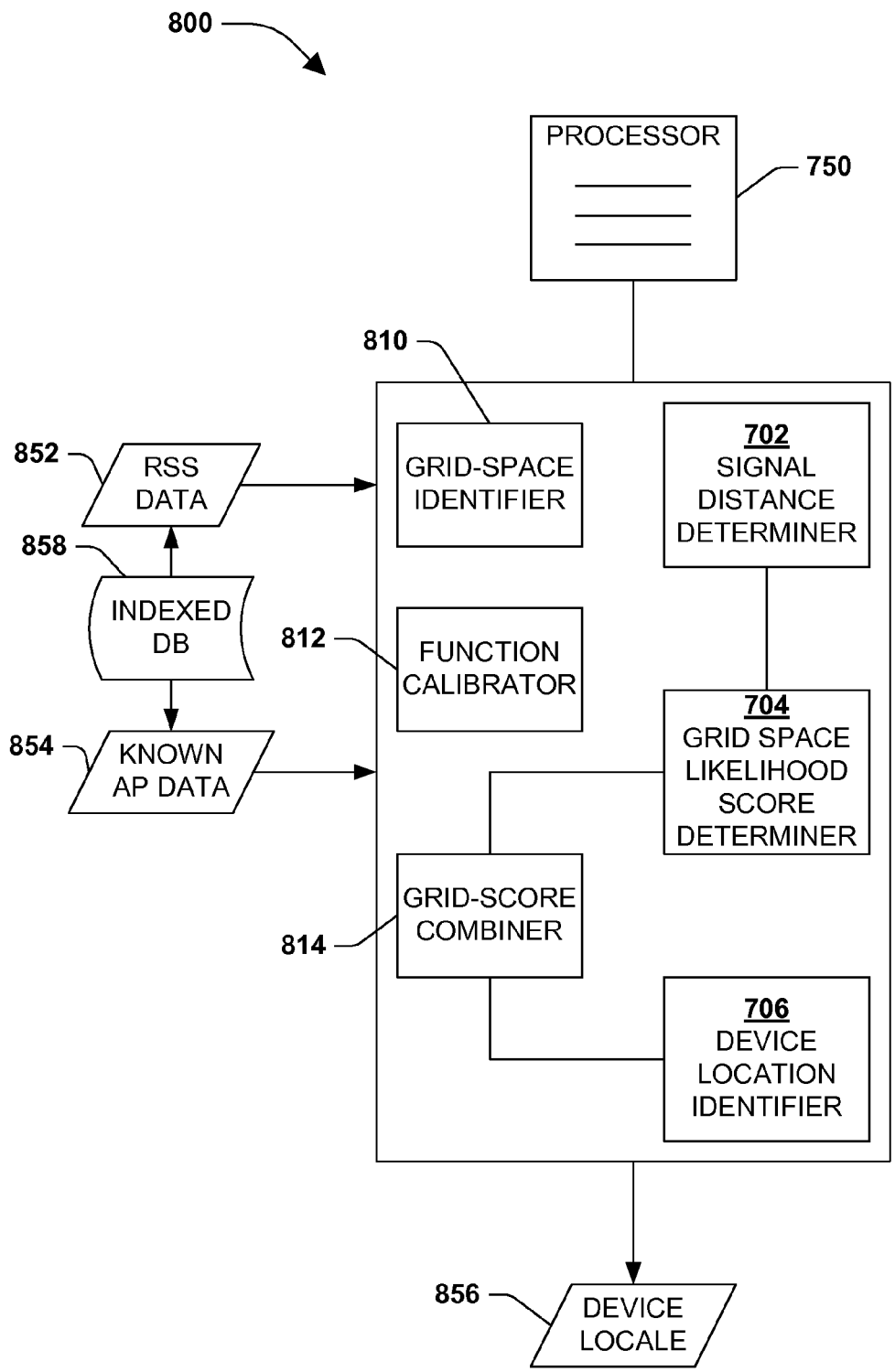
FIG. 8 is a component diagram illustrating an example embodiment where one or more portions of systems described herein may be implemented.

FIG. 8 is a component diagram illustrating an example embodiment 800 where one or more portions of systems described herein may be implemented. In this example 800, an extension of FIG. 7 is provided and thus description of elements, components, etc. described with respect to FIG. 7 may not be repeated for simplicity. In the example embodiment 800, a grid space identification component 810 can be configured to determine a grid space location, where the grid space location may be used to determine a known distance in combination with a known AP location, based at least on known AP data 854.

The known AP data 854 may be retrieved from an indexed database 858 comprising data from one or more mobile device signal reports, for example. A mobile device signal report can comprise information related to a signal received by an AP, such as: a RSS, a mobile device ID, a data packet ID for a data packet comprised in the signal, a time stamp corresponding to a time the signal was received by the AP, a transmission power of the mobile device, an AP ID, and/or an AP location, for example.

As one example, the grid space identification component 810 may create a grid, comprising a plurality of grid spaces, which overlays a candidate area (e.g., a floor of a selected building) that may comprise the location of a mobile device. In this example, a location of the respective grid spaces may be known in relation to a position in the candidate area. In this way, along with a known AP location, a first grid space distance between a first grid space and a first AP may be identified.

In one embodiment, the grid space identification component 810 can be configured to determine a grid layout for an area (e.g., the candidate area) based at least on a one or more known AP locations (e.g., in the known AP data 854) for APs that received a signal from the mobile device, during a desired time period. As one example, a set of AP locations may be identified from the indexed database 858, based on a mobile device ID that corresponds to one or more RSSs (e.g., RSS data 852) from the desired time period, which may correspond to one or more APs. In this example, one or more APs may be filtered by filtering out those AP locations that do not meet a distance threshold. For example, an AP that is located outside of the candidate area (e.g., another building and/or floor) may comprise an AP location that is outside the distance threshold. In this way, a set of one or more filtered AP locations may correspond to one or more APs that are comprised within the candidate area, and thereby are (more likely to be) within the grid layout.

In one embodiment, the signal distance determination component 702 may be configured to combine a base path loss function for a grid space with an indication of RSS (e.g., or signal attenuation) associated with an AP, from the mobile device, to determine a signal distance between the grid space and the AP. Further, a function calibration component 812 may be configured to calibrate the base path loss function for mobile device. As one example, the base (e.g., "ideal") path loss function may not account for environment conditions of the candidate area (e.g., building configuration, building components, electronic devices, etc.), and/or a type of mobile device (e.g., transmission power, platform, operating system, etc.). In this example, the base path loss function may be calibrated for the mobile device, resulting in a mobile device path loss function.

In one embodiment, the function calibration component 812 may calibrate the base path loss function for the mobile device by determining an expected device distance between a first AP and a first grid space using the mobile device's transmission power and a first grid-space distance (e.g., known distance between the first grid space and the first AP). The expected distance can be compared to a first RSS, where the first RSS comprises an indication of signal strength for a signal transmitted from the mobile device and received by the first AP. Further, in this embodiment, the function calibration component 812 may determine a mobile device RSS difference based at least on a combination of the expected mobile device distance and first grid-space distance. Additionally, the base path loss function may be adjusted (e.g., for the mobile device) based at least upon the mobile device RSS difference. In this way, for example, the calibrated path loss function may account for the type of mobile device that is being detected (e.g., and/or real-world environment comprised by the candidate area).

In one embodiment, the function calibration component 812 may be configured to calibrate the base path loss function for an AP (e.g., first AP) by determining an expected AP distance between a first AP and a second AP using a second AP RSS/signal attenuation, where the second AP RSS/signal attenuation comprises an indication of signal strength/signal attenuation for a signal transmitted from the second AP and received (and reported) by the first AP. Further, in this embodiment, the function calibration component 812 may determine an AP difference based at least on a combination of the expected AP distance and a known AP distance, where the known AP distance comprises a known distance between the first AP and the second AP. Additionally, the base path loss function may be adjusted (e.g., for the first AP) based at least upon the AP difference. The calibrated path-loss function (e.g., for the first AP), for example, may address at least some of the real-world environment comprised by the candidate area (e.g., at least with regard to the first AP).

In the example embodiment 800, a grid score combination component 814 may be configured to combine a grid space likelihood score (e.g., a first grid space likelihood score for the first grid-space) with a grid space likelihood score function resulting in a modified grid space likelihood score (e.g., a first modified grid space likelihood score). As one example, the grid space likelihood score function may be configured to provide a modified grid space likelihood score that indicates a probability that the mobile device is located in the corresponding grid-space. As another example, the grid space likelihood score function may be configured to provide a modified grid space likelihood score that is weighted based on one or more weighting factors, such as a ranking of one or more RSSs for the grid-space.

In one embodiment, the grid score combination component 814 may be configured to combine a first grid space likelihood score corresponding to a first AP for the grid space (e.g., the first grid space), a second grid space likelihood score corresponding to a second AP for the grid space, a first modified grid space likelihood score corresponding to the first AP for the grid space, and/or a second modified grid space likelihood score corresponding to the second AP for the grid space, resulting in an overall grid space likelihood score for the grid space. That is, for example, a first overall grid space likelihood score for the first grid space may comprise a combination of grid space likelihood scores from respective APs in the candidate area. As another example, the first overall grid space likelihood score for the first grid space may comprise a combination of modified grid space likelihood scores from respective APs in the candidate area. In one embodiment, the overall grid space likelihood score may be used to identify the location 856 of the mobile device in the candidate area.

Figure 9:
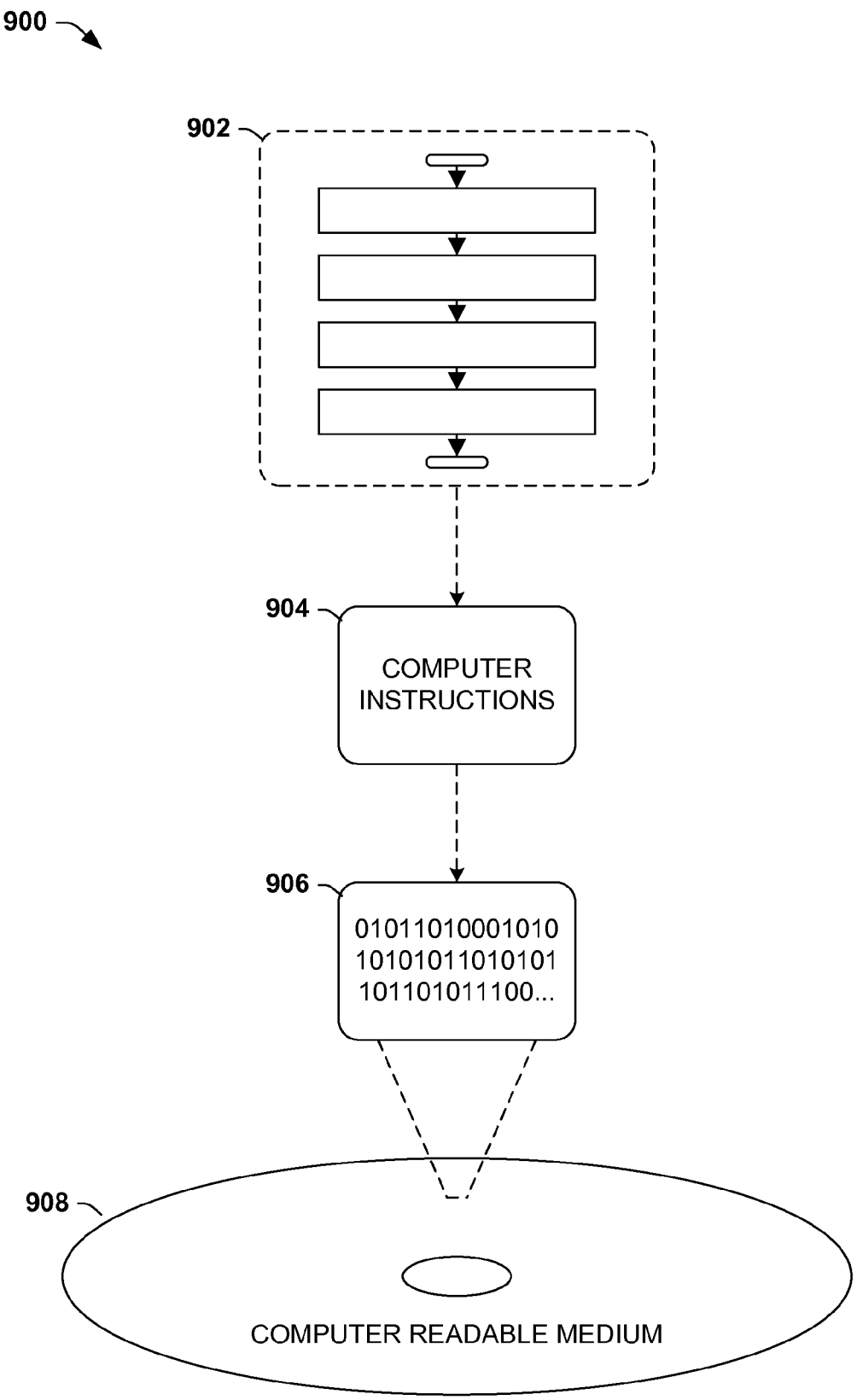
FIG. 9 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 9, wherein the implementation 900 comprises a computer-readable medium 908 (e.g., a CD-R, DVD-R or a platter of a hard disk drive), on which is encoded computer-readable data 906. This computer-readable data 906 in turn comprises a set of computer instructions 904 configured to operate according to one or more of the principles set forth herein. In one such embodiment 902, the processor-executable instructions 904 may be configured to perform a method, such as at least some of the exemplary method 100 of FIG. 1, for example. In another such embodiment, the processor-executable instructions 904 may be configured to implement a system, such as at least some of the exemplary system 700 of FIG. 7, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system," "interface," and the like are generally intended to refer to a computer-related entity, either hardware, a combination of hardware and software, software, or software in execution. For example, a component may be, but is not limited to being, a process running on a processor, a processor, an object, an executable, a thread of execution, a program and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device, carrier or media. Of course, those skilled in the art will recognize many modifications may be made to this configuration without departing from the scope or spirit of the claimed subject matter.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

Figure 10:
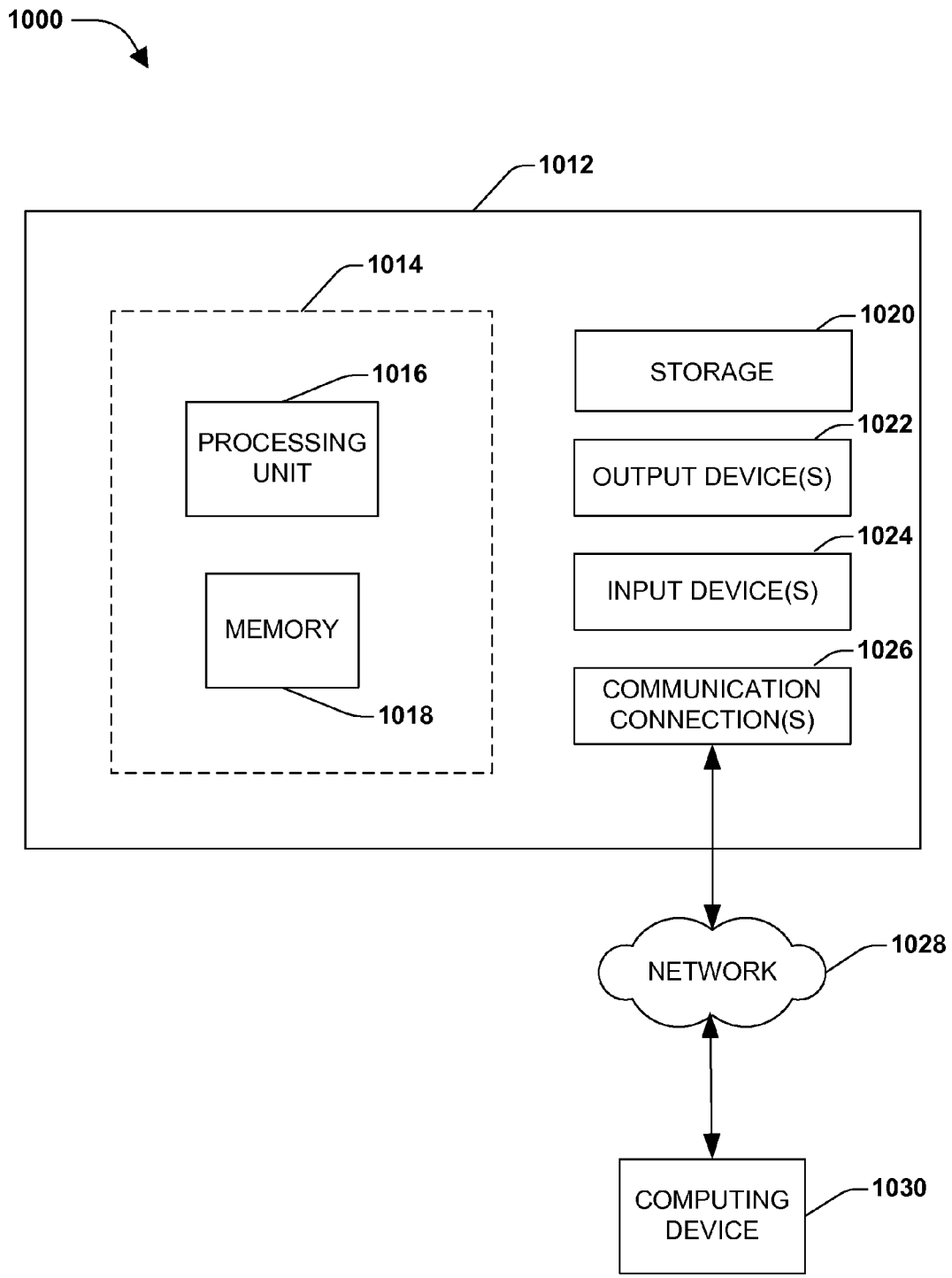
FIG. 10 illustrates an exemplary computing environment wherein one or more of the provisions set forth herein may be implemented.

FIG. 10 illustrates an example of a system 1000 comprising a computing device 1012 configured to implement one or more embodiments provided herein. In one configuration, computing device 1012 includes at least one processing unit 1016 and memory 1018. Depending on the exact configuration and type of computing device, memory 1018 may be volatile (such as RAM, for example), non-volatile (such as ROM, flash memory, etc., for example) or some combination of the two. This configuration is illustrated in FIG. 10 by dashed line 1014.

In other embodiments, device 1012 may include additional features and/or functionality. For example, device 1012 may also include additional storage (e.g., removable and/or non-removable) including, but not limited to, magnetic storage, optical storage, and the like. Such additional storage is illustrated in FIG. 10 by storage 1020. In one embodiment, computer readable instructions to implement one or more embodiments provided herein may be in storage 1020. Storage 1020 may also store other computer readable instructions to implement an operating system, an application program and the like. Computer readable instructions may be loaded in memory 1018 for execution by processing unit 1016, for example.

The term "computer readable media" as used herein includes computer storage media. Computer storage media includes volatile and nonvolatile, removable and non-removable media implemented in any method or technology for storage of information such as computer readable instructions or other data. Memory 1018 and storage 1020 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1012. Any such computer storage media may be part of device 1012.

Device 1012 may also include communication connection(s) 1026 that allows device 1012 to communicate with other devices. Communication connection(s) 1026 may include, but is not limited to, a modem, a Network Interface Card (NIC), an integrated network interface, a radio frequency transmitter/receiver, an infrared port, a USB connection or other interfaces for connecting computing device 1012 to other computing devices. Communication connection(s) 1026 may include a wired connection or a wireless connection. Communication connection(s) 1026 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1012 may include input device(s) 1024 such as keyboard, mouse, pen, voice input device, touch input device, infrared cameras, video input devices, and/or any other input device. Output device(s) 1022 such as one or more displays, speakers, printers, and/or any other output device may also be included in device 1012. Input device(s) 1024 and output device(s) 1022 may be connected to device 1012 via a wired connection, wireless connection, or any combination thereof. In one embodiment, an input device or an output device from another computing device may be used as input device(s) 1024 or output device(s) 1022 for computing device 1012.

Components of computing device 1012 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 1012 may be interconnected by a network. For example, memory 1018 may be comprised of multiple physical memory units located in different physical locations interconnected by a network.

Those skilled in the art will realize that storage devices utilized to store computer readable instructions may be distributed across a network. For example, a computing device 1030 accessible via network 1028 may store computer readable instructions to implement one or more embodiments provided herein. Computing device 1012 may access computing device 1030 and download a part or all of the computer readable instructions for execution. Alternatively, computing device 1012 may download pieces of the computer readable instructions, as needed, or some instructions may be executed at computing device 1012 and some at computing device 1030.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, At least one of A and B and/or the like generally means A or B or both A and B. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A computer based method for identifying a location of a mobile device, comprising:
    determining a first signal distance between a first grid space and a first access point (AP) using a first received signal strength (RSS), the first RSS comprising an indication of mobile device signal strength received by the first AP, the determining comprising combining the first RSS with an AP path loss function to determine the first signal distance, wherein the AP path loss function is obtained by calibrating a base path loss function, the calibration comprising:
        determining a first expected distance between the first AP and a second AP using a first AP RSS, the first AP RSS comprising an indication of signal strength for a signal transmitted from the second AP and received by the first AP;
        determining a first AP difference based at least on a combination of the first expected distance and a first known AP distance, the first known AP distance comprising a known distance between the first AP and the second AP; and
        adjusting the base path loss function based at least on the first AP difference;
    comparing the first signal distance with a first grid space distance, resulting in a first grid space likelihood score, the first grid space distance comprising a known distance between the first AP and the first grid space; and
    identifying the location of the mobile device based at least on the first grid space likelihood score, at least a portion of the method implemented at least in part via a processing unit.

2. The method of claim 1, comprising:
    determining a second grid space likelihood score for a second grid space, and
    the identifying the location of the mobile device comprising comparing the first grid space likelihood score with the second grid space likelihood score.

3. The method of claim 2, the determining a second grid space likelihood score comprising comparing the first signal distance with a second grid space distance, the second grid space distance comprising a known distance between the first AP and the second grid space.

4. The method of claim 1, comprising determining the first grid space distance, comprising calculating a distance between a known location of the first grid space and a known location of the first AP.

5. The method of claim 1, comprising receiving a mobile device location query, the mobile device location query indicating one or more of:
    a mobile device identifier (ID); or
    a desired period of time.

6. The method of claim 5, comprising retrieving the first RSS from a database, the first RSS indexed by one or more of:
    the mobile device ID;
    a first time stamp indicating a first time within the desired period of time; or
    a first data packet identifier (ID) associated with the first RSS, the first data packet ID indicating a second time within the desired period of time.

7. The method of claim 1, the comparing the first signal distance with a first grid space distance comprising inputting the first signal distance and the first grid space distance into a likelihood score function.

8. The method of claim 1, comprising storing the first RSS in a database indexed by one or more of the following received in a first RSS report from the first AP:
- a mobile device ID;
- a first data packet ID associated with the first RSS;
- a first time stamp associated with the first RSS;
- transmission power data indicating a transmission power of the mobile device;
- a mobile device type;
- a first AP identifier (ID); and
- a location of the first AP.

9. The method of claim 1, comprising identifying a desired grid layout, the desired grid layout comprising an area comprising the first grid space at a known location and the location of the mobile device.

10. The method of claim 9, the identifying a desired grid layout comprising selecting the area that comprises at least the first AP.

11. The method of claim 1, wherein the first grid space likelihood score is combined with grid space likelihood score function resulting in a modified grid space likelihood score.

12. The method of claim 1, further comprising creating a grid, comprising a plurality of grid spaces, which overlays a candidate area including the location of the mobile device.

13. A system for identifying a location of a mobile device, comprising:
- a signal distance determination component configured to determine a signal distance between a grid space, associated with the mobile device, and an access point (AP) using an indication of received of signal strength (RSS) associated with the mobile device, the signal distance determination component configured to combine a base path loss function for the AP with the indication of RSS to determine the signal distance;
- a function calibration component configured to calibrate the base path loss function for the AP by:
  - determining an expected AP distance between the AP and a second AP using a first AP RSS, the first AP RSS comprising an indication of signal strength for a signal transmitted from the second AP and received by the AP;
  - determining an AP difference based at least on a combination of the expected AP distance and a known AP distance, the known AP distance comprising a known distance between the AP and the second AP; and
  - adjusting the base path loss function based at least on the AP difference;
- a grid space likelihood score determination component, operably coupled with the signal distance determination component, configured to determine a grid space likelihood score for the grid space based at least on a comparison of the signal distance and a grid space distance between the AP and the grid space; and
- a device location identification component, operably coupled with the grid space likelihood score determination component, configured to identify the location of the mobile device based at least on the grid space likelihood score, at least a portion of the system implemented at least in part via a processing unit.

14. The system of claim 13, comprising a grid space identification component configured to determine a grid space location, the grid space location used to determine the grid space distance in combination with a known AP location.

15. The system of claim 14, the grid space identification component configured to determine a desired grid layout for an area based at least on the known AP location.

16. The system of claim 13, comprising a grid score combination component configured to
- combine the grid space likelihood score with a grid space score function resulting in a modified grid space likelihood score.

17. The system of claim 16, wherein the modified grid space likelihood score indicates a probability that the mobile device is located in the corresponding grid-space.

18. A computer readable storage device comprising computer executable instructions that when executed perform a method for identifying a location of a mobile device, comprising:
- determining a first signal distance between a first grid space and a first access point (AP) using a first received signal strength (RSS), the first RSS comprising an indication of mobile device signal strength received by the first AP, the determining comprising combining the first RSS with an AP path loss function to determine the first signal distance, wherein the AP path loss function is obtained by calibrating a base path loss function, the calibration comprising:
  - determining a first expected distance between the first AP and a second AP using a first AP RSS, the first AP RSS comprising an indication of signal strength for a signal transmitted from the second AP and received by the first AP;
  - determining a first AP difference based at least on a combination of the first expected distance and a first known AP distance, the first known AP distance comprising a known distance between the first AP and the second AP; and
  - adjusting the base path loss function based at least on the first AP difference;
- comparing the first signal distance with a first grid space distance, resulting in a first grid space likelihood score, the first grid space distance comprising a known distance between the first AP and the first grid space; and
- identifying the location of the mobile device based at least on the first grid space likelihood score.

19. The computer readable storage device of claim 18, comprising:
- determining a second grid space likelihood score for a second grid space, and
- the identifying the location of the mobile device comprising comparing the first grid space likelihood score with the second grid space likelihood score.

20. The computer readable storage device of claim 19, the determining a second grid space likelihood score comprising comparing the first signal distance with a second grid space distance, the second grid space distance comprising a known distance between the first AP and the second grid space.

* * * * *